(12) United States Patent
Ogishima et al.

(10) Patent No.: US 12,266,818 B2
(45) Date of Patent: Apr. 1, 2025

(54) BATTERY PACK

(71) Applicant: SANYO Electric Co., Ltd., Osaka (JP)

(72) Inventors: Yuji Ogishima, Hyogo (JP); Keisuke Minami, Hyogo (JP); Kazuki Takeno, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 543 days.

(21) Appl. No.: 17/634,411

(22) PCT Filed: Sep. 11, 2020

(86) PCT No.: PCT/JP2020/034400
§ 371 (c)(1),
(2) Date: Feb. 10, 2022

(87) PCT Pub. No.: WO2021/065420
PCT Pub. Date: Apr. 8, 2021

(65) Prior Publication Data
US 2022/0320671 A1 Oct. 6, 2022

(30) Foreign Application Priority Data
Sep. 30, 2019 (JP) .................... 2019-180210

(51) Int. Cl.
*H01M 50/291* (2021.01)
*H01M 4/13* (2010.01)
(Continued)

(52) U.S. Cl.
CPC ......... *H01M 50/291* (2021.01); *H01M 4/131* (2013.01); *H01M 4/364* (2013.01);
(Continued)

(58) Field of Classification Search
CPC .. H01M 50/291; H01M 50/209; H01M 4/131; H01M 4/364
See application file for complete search history.

(56) References Cited

U.S. PATENT DOCUMENTS

2006/0286439 A1* 12/2006 Fujikawa .............. H01M 50/42
429/231.95
2008/0160395 A1 7/2008 Okada et al.
(Continued)

FOREIGN PATENT DOCUMENTS

JP 2006-278182 A 10/2006
JP 2009-259455 A 11/2009
(Continued)

OTHER PUBLICATIONS

Machine Translation of: JP 2013-109858 A, Yamafuku et al., Jun. 6, 2013.*
(Continued)

*Primary Examiner* — Kenneth J Douyette
(74) *Attorney, Agent, or Firm* — Rimon P.C.

(57) ABSTRACT

Each prismatic cell is provided with a rolled electrode assembly, and the rolled electrode assembly has a flat section with a flat outer peripheral surface and two curved sections with a curved outer peripheral surface. Each spacer has a substrate and multiple ribs protruding on at least one side of the substrate, and the ribs are formed so as to face the flat section of the rolled electrode assembly and extend in a direction substantially perpendicular to the rolling axis of the rolled electrode assembly. The ribs have a length of 60 to 100 when the height of the flat section of the rolled electrode assembly is represented by 100, and the relationship $2 \leq B/A \leq 10$ is satisfied where A is the width of the ribs and B is the distance between adjoining ribs.

8 Claims, 6 Drawing Sheets

(51) Int. Cl.

| | |
|---|---|
| *H01M 4/131* | (2010.01) |
| *H01M 4/36* | (2006.01) |
| *H01M 10/0525* | (2010.01) |
| *H01M 10/0585* | (2010.01) |
| *H01M 10/0587* | (2010.01) |
| *H01M 50/103* | (2021.01) |
| *H01M 50/119* | (2021.01) |
| *H01M 50/209* | (2021.01) |

(52) U.S. Cl.
CPC ... *H01M 10/0525* (2013.01); *H01M 10/0585* (2013.01); *H01M 10/0587* (2013.01); *H01M 50/103* (2021.01); *H01M 50/119* (2021.01); *H01M 50/209* (2021.01)

(56) References Cited

U.S. PATENT DOCUMENTS

| | | | | |
|---|---|---|---|---|
| 2014/0045049 | A1* | 2/2014 | Iyori | H01M 50/536 |
| | | | | 429/179 |
| 2016/0190634 | A1 | 6/2016 | Takahata | |
| 2018/0083284 | A1* | 3/2018 | Yamashita | H01M 4/628 |

FOREIGN PATENT DOCUMENTS

| | | |
|---|---|---|
| JP | 2013-109858 A | 6/2013 |
| JP | 2016-122587 A | 7/2016 |
| JP | 2017-091886 A | 5/2017 |
| JP | 2017-098107 A | 6/2017 |
| JP | 2017-212120 A | 11/2017 |
| JP | 2018-032581 A | 3/2018 |

OTHER PUBLICATIONS

Machine Translation of: JP 2006-278182 A, Inomata et al., Oct. 12, 2006.*

International Search Report and Written Opinion issued in International Patent Application No. PCT/JP2020/034400 dated Nov. 10, 2020, with partial English translation.

Extended European Search Report dated Dec. 5, 2022 issued in the corresponding European Patent Application No. 20872472.4.

* cited by examiner

BATTERY PACK

CROSS-REFERENCE OF RELATED APPLICATIONS

This application is the U.S. National Phase under 35 U.S.C. § 371 of International Patent Application No. PCT/JP2020/034400, filed on Sep. 11, 2020, which in turn claims the benefit of Japanese Application No. 2019-180210, filed on Sep. 30, 2019, the entire disclosures of which Applications are incorporated by reference herein.-

TECHNICAL FIELD

The present disclosure relates to an assembled battery in which rectangular batteries and spacers are alternately stacked.

BACKGROUND ART

An assembled battery in which rectangular batteries and spacers are alternately stacked is widely known. PATENT LITERATURE 1, for example, discloses an assembled battery in which rectangular batteries and inter-battery spacers are alternately stacked and ribs are formed on the spacers in an approximately E-shaped area facing the tops and both ends, defined with respect to the width direction, of the electrode windings. In the assembled battery disclosed in PATENT LITERATURE 1, the ribs formed on the spacers press the battery case containing the electrode windings. To be specific, the ribs pressurize the top and both ends, defined with respect to the width direction, of the battery case.

CITATION LIST

Patent Literature

PATENT LITERATURE 1: Japanese Unexamined Patent Application Publication No. 2018-032581

SUMMARY

In conventional techniques including PATENT LITERATURE 1, it has been disclosed that the phenomenon in which the electrolyte leaks out of electrode windings due to the expansion of the electrode windings and causes degradation (high-rate degradation) is suppressed by using spacers with ribs formed in an approximately E-shape. However, in these conventional techniques, the electrolyte accumulation in the electrode windings, i.e., electrolyte retention, is not sufficient for vehicle-installed batteries, where the charging and discharging rates are increasingly high, and the degradation rate is high. To solve these problems, further suppression in high-rate degradation has been required.

An assembled battery that is one aspect of the present disclosure comprises a rectangular battery and a spacer, wherein the rectangular battery comprises a flat winding-type electrode winding having a positive electrode plate including a positive electrode mixture layer, and a negative electrode plate including a negative electrode mixture layer, wound together with a separator between the positive electrode plate and the negative electrode plate, the electrode winding having a flat part with a flat outer surface and two curved parts with curved outer surfaces; a non-aqueous electrolyte; and a battery case containing the electrode winding and the non-aqueous electrolyte, the spacer has a board and multiple ribs protruding from at least one side of the board, the ribs face the flat part of the electrode winding and extend in a direction approximately perpendicular to the winding axis of the electrode winding, when the height of the flat part of the electrode winding is 100, the length of the ribs is 60 or more and 100 or less, when the width of the ribs is A and the interval between the adjacent ribs is B, 2≤B/A≤10, and the assembled battery includes at least one minimum unit of the spacer, the rectangular battery, and the spacer stacked in this order.

According to one aspect of the present disclosure, an assembled battery may be provided that effectively suppresses leakage of electrolyte from electrode windings during charging and discharging and reduces high-rate degradation.

DESCRIPTION OF EMBODIMENTS

According to one aspect of the present disclosure, leakage of electrolyte during charging and discharging can be effectively suppressed by pressurizing an appropriate spot on each flat electrode winding having flat and curved parts, from outside a rectangular battery as described above. In an assembled battery according to the present disclosure, the electrolyte pushed out of the flat part of each electrode winding when the electrode winding expands due to the expansion of the negative electrode upon charging is effectively stocked in the curved parts. When the volume of the flat parts shrinks, e.g., upon discharging, the electrolyte stocked in the curved parts returns to the flat part, thereby suppressing the electrolyte shortage in the flat part. Therefore, with the assembled battery according to the present disclosure, the high-rate degradation caused by a decrease in the amount of the electrolyte in the flat parts in the electrode assembly can be reduced.

An example of an embodiment of the present disclosure will be described in detail below. In the following description, specific shapes, materials, directions, numerical values, and the like are merely illustrative and given to facilitate understanding of the present disclosure, and can be changed as appropriate according to the application, purpose, specifications, and the like. The expression "approximately" herein means, when things are approximately the same, these are supposed to be both completely the same and substantially the same.

Figure 1:
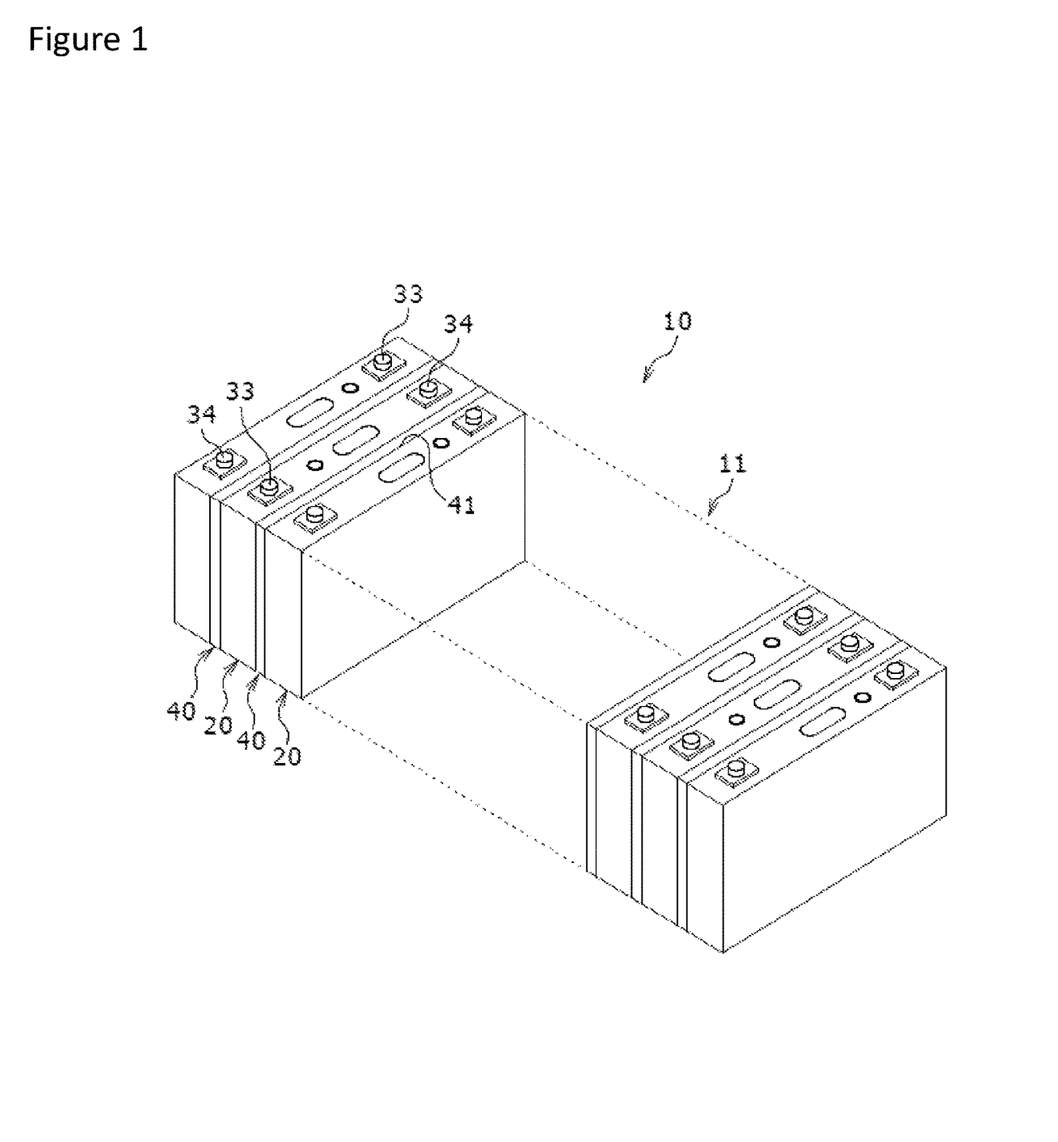
FIG. 1 is a perspective view of an assembled battery of an embodiment.

An assembled battery 10 will now be described with reference to FIG. 1. FIG. 1 is a perspective view of the assembled battery 10.

The assembled battery 10 includes rectangular batteries 20 and spacers 40 which are alternately stacked. Multiple rectangular batteries 20 are stacked in the thickness direction with spacers 40 therebetween, thereby forming a battery laminate 11. Note that in the assembled battery 10, although not shown in the drawing, end plates are located at both ends with respect to the stacking direction of the battery laminate 11, and the end plates are fixed to each other through binding bars which are not shown in the drawing. Adjacent rectangular batteries 20 are electrically connected to each other via busbars not shown in the drawing. Note that, although not shown in the drawing, spacers 40 may be located between the end plates and the battery laminate 11. This allows the rectangular batteries 20 to be subjected to uniform pressure, regardless of their positions in the assembled battery 10, thereby enhancing the advantageous effects of the present disclosure.

In the multiple rectangular batteries 20, positive electrode terminals 33 and negative electrode terminals 34, which will be described in detail below, are located so that they are alternately aligned in the stacking direction of the rectangular batteries 20 and their directions of polarities alternate. Connecting each positive electrode terminal 33 to the negative electrode terminal 34 located adjacent to it in the stacking direction via a busbar allows the multiple rectangular batteries 20 to be electrically connected in series.

Each spacer 40 includes an approximately flat board 41, the details of which will be described later. The board 41 is a part that is placed between the rectangular batteries 20, and has multiple ribs 45 (see FIG. 3) that are projections formed on one or both sides defined with respect to the thickness direction (stacking direction).

The end plates located at both ends, defined with respect to the stacking direction (thickness direction), of the battery laminate 11 are preferably made of a highly rigid material to prevent excessive load on the bus bars due to changes in the constraint width between the rectangular batteries 20 caused by deformation of the rectangular batteries 20 due to the expansion and shrinkage of the electrode windings described above, and are preferably made also light in weight when the assembled battery is supposed to be installed on a vehicle. For this reason, preferred examples of materials for the end plates include metals, such as aluminum and aluminum alloys, and hard resins. A restraining force is applied from the outside of a pair of end plates defined with respect to the stacking direction, in the direction of the compression of the rectangular batteries 20 in the stacking direction. For example, metal binding bars are used to fix the pair of end plates. In this state, the distance between the pair of end plates is made shorter than the length of the battery laminate 11 in the stacking direction with no restraining force applied to the battery laminate 11, thereby applying a restraining force to the battery laminate 11 in the compression direction and retaining the state where the restraining force is applied to it. In this way, a restraining force can be applied to and retained in the rectangular batteries 20 via the spacers 40.

Figure 2A:
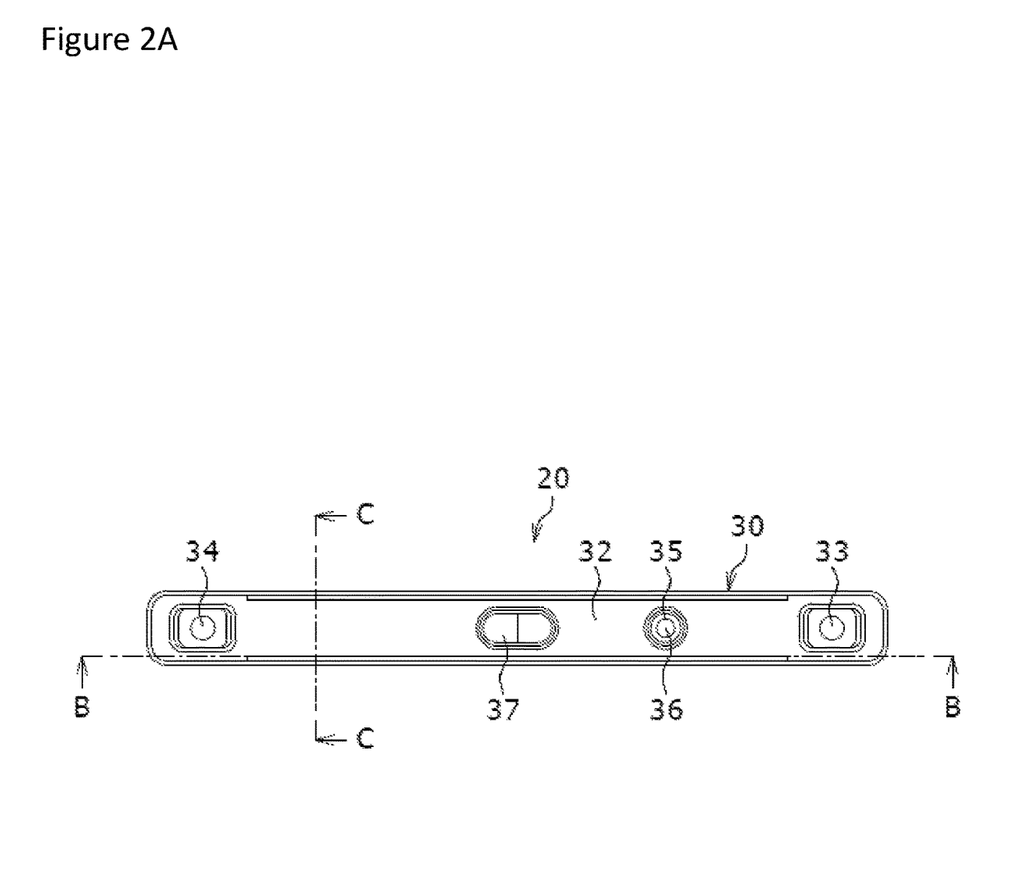
FIG. 2A is a plan view of a rectangular battery of the embodiment.
Figure 2B:
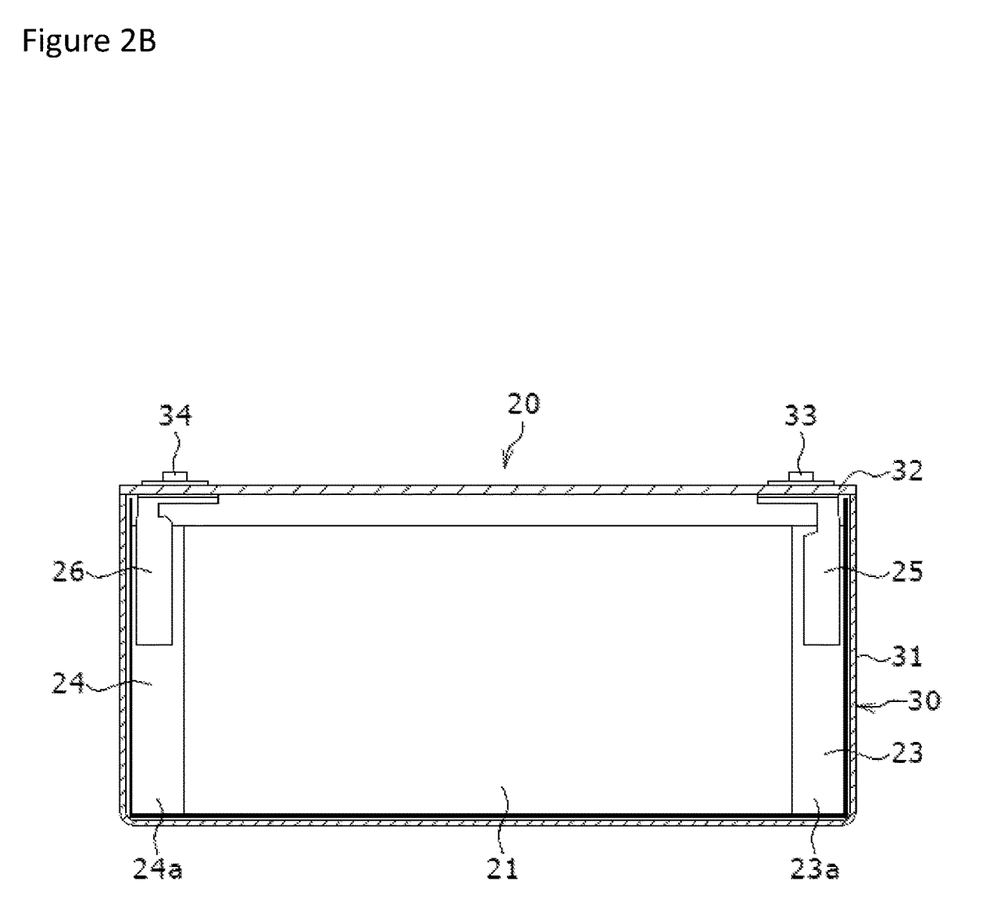
FIG. 2B is a cross-sectional view along line B-B shown in FIG. 2A.

The rectangular batteries 20 will now be described with reference to FIGS. 2A, 2B, and 2C.

Each rectangular battery 20 has a winding-type electrode winding 21 that is formed in a flat shape and has a positive electrode plate 23, a negative electrode plate 24, and a separator (not shown in the drawing). Although not shown in the drawing, the electrode winding 21 covered with an insulating sheet is contained in the battery case 30. The battery case 30 contains the electrolyte in addition to the electrode winding 21 and the insulating sheet.

[Electrode Winding]

Figure 2C:
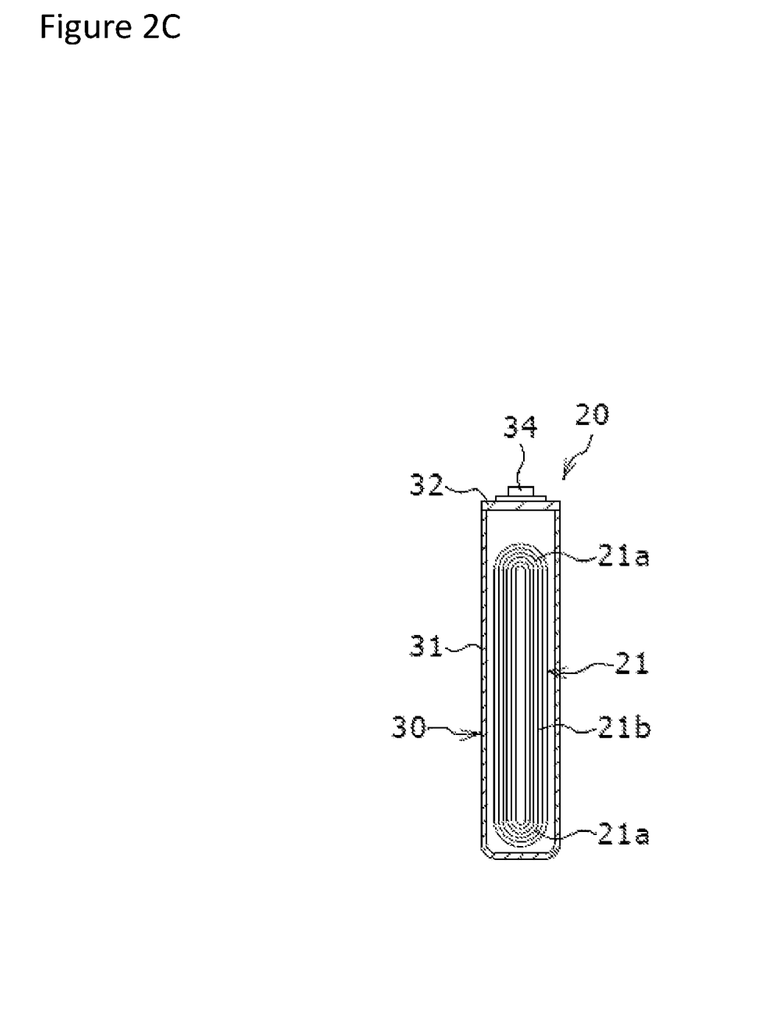
FIG. 2C is a cross-sectional view along line C-C shown in FIG. 2A.

As illustrated in FIG. 2C, the electrode winding 21 is a winding-type electrode assembly that has a positive electrode plate 23 and a negative electrode plate 24 wound together about the winding axis with a separator therebetween, and is formed into a flat shape with a flat part 21b and a pair of curved parts 21a. For convenience of explanation herein, the vertical direction in which the flat part 21b and the pair of curved parts 21a are aligned is referred to as the "height direction," the direction along the winding axis of the electrode winding 21 is referred to as the "width direction," and the direction perpendicular to the directions along the width and height is referred to as the "thickness direction." In this embodiment, the electrode winding 21 is contained in the battery case 30 in the state where the width direction of the electrode winding 21 extends along the horizontal direction of the battery case, and the height direction of the electrode winding 21 extends along the height direction of the rectangular outer body 31.

The flat part 21b is a part where the electrode plates (positive electrode plate 23 and negative electrode plate 24) are positioned in approximately parallel with each other along the height direction without being curved. The pair of curved parts 21a are parts where the electrode plates are curved in an arc shape, and in each curved part 21a, the electrode plates are curved so that they project outward in the height direction. The pair of curved parts 21a are formed on both sides of the electrode winding 21 with respect to the height direction, sandwiching the flat part 21b.

As will be described in detail later, the electrode winding 21 is made by pressing a winding that consists of the positive electrode plate 23 and the negative electrode plate 24 wound in a cylindrical shape with a separator therebetween, in the radial direction under a predetermined pressure, and forming it into a flat shape.

The electrode winding 21 includes, for example, two long separators located so that the positive electrode plate 23 is sandwiched therebetween, and the separator, positive electrode plate 23, separator, and negative electrode plate 24 are aligned in this order from the inner side of the electrode winding 21. In this case, the length of each separator is preferably at least longer than the length of the positive electrode plate 23. Also, the width of each separator is at least longer than the width of a positive electrode mixture layer (the length of the positive electrode mixture layer along the width direction of the electrode winding 21). The width of the separator may be longer than the width of a negative electrode mixture layer.

The length of the electrode winding 21 in the height direction is the electrode winding height (H). The ratio (K/H) of the length (K) of the positive electrode mixture layer along the width direction of the electrode assembly to the height (H) of the electrode winding is preferably 1.2 or more, more preferably 1.5 or more. The ratio (K/H) may be hereinafter referred to as the aspect ratio. When the aspect ratio (K/H) is 1.2 or more, the amount of electrolyte pushed out of both ends of the flat part defined with respect to the width direction exceeds the amount of electrolyte pushed out of both ends of the flat part defined with respect to the length direction (both ends of the electrode assembly defined with respect to the width direction) during charging, so that the non-aqueous electrolyte stocking function of the curved parts easily appears. The upper limit of the aspect ratio (K/H) is not particularly limited, but is preferably 3.0 or less.

[Positive Electrode]

The positive electrode plate 23 includes a positive electrode core body made of metal and a positive electrode mixture layer lying on both sides of the electrode core body, and has, at one end defined with respect to the lateral direction, a positive electrode core body exposed portion 23a where the positive electrode core body is exposed along the longitudinal direction. The positive electrode core body exposed portion 23a is located adjacent to one end of the electrode winding 21 defined with respect to the width direction (right side in FIG. 2(b)). The laminate portion of the positive electrode core body exposed portion 23a is electrically connected to a positive electrode current collector 25 by welding or the like. A preferred positive electrode current collector 25 is made of aluminum or an aluminum alloy. The positive electrode current collector 25 is electrically connected to the positive electrode terminal 33.

The aforementioned positive electrode core body can be a foil or the like of a metal that is stable in the positive electrode potential range in the battery operating voltage range, such as aluminum or an aluminum alloy. The positive electrode mixture layer includes a positive electrode active material, a conductive agent, and a binder. The positive electrode plate 23 can be made by applying a positive electrode mixture slurry including a positive electrode active material, a conductive agent, a binder, a dispersant, and the like, on a positive electrode core body, drying the coating film to remove the dispersant, and then compressing the coating film to form a positive electrode mixture layer on both sides of the positive electrode core body.

The positive electrode active material is composed mainly of a lithium-containing transition metal composite oxide. Examples of metal elements contained in the lithium-containing transition metal composite oxide include Ni, Co, Mn, Al, B, Mg, Ti, V, Cr, Fe, Cu, Zn, Ga, Sr, Zr, Nb, In, Sn, Ta, and W. An example of a preferred lithium-containing transition metal composite oxide is a composite oxide containing at least one of the group consisting of Ni, Co, and Mn. Note that inorganic compound particles such as aluminum oxide and lanthanide-containing compounds may reside on the surface of the lithium-containing transition metal composite oxide particles.

Examples of conductive agents included in the positive electrode mixture layer include carbon materials such as carbon black, acetylene black, ketjen black, and graphite. Examples of binders included in the positive electrode mixture layer include fluoro-resins, such as polytetrafluoroethylene (PTFE) and polyvinylidene fluoride (PVdF), polyacrylonitrile (PAN), polyimide, acrylic resin, and polyolefin. These resins may be combined with a cellulose derivative, such as carboxymethyl cellulose (CMC) or its salt, polyethylene oxide (PEO), or the like.

[Negative Electrode]

The negative electrode plate 24 includes a negative electrode core body made of metal and a negative electrode mixture layer lying on both sides of the electrode core body, and has, at one end defined with respect to the lateral direction, a negative electrode core body exposed portion 24a where the negative electrode core body is exposed along the longitudinal direction. The negative electrode core body exposed portion 24a is located adjacent to the other end of the electrode winding 21 defined with respect to the width direction (left side in FIG. 2(b)). The laminate portion of the negative electrode core body exposed portion 24a is electrically connected to a negative electrode current collector 26 by welding or the like. A preferred negative electrode current collector 26 is made of copper or a copper alloy. The negative electrode current collector 26 is electrically connected to the negative electrode terminal 34.

The aforementioned negative electrode core body can be a foil or the like of a metal that is stable in the negative electrode potential range in the battery operating voltage range, such as copper or a copper alloy. The thickness of the negative electrode core body is 5 µm or more and 20 µm or less, for example. The negative electrode mixture layer includes a negative electrode active material and a binder. The thickness of the negative electrode mixture layer on one side of the negative electrode core body is, for example, 50 µm or more and 150 µm or less, preferably 80 µm or more and 120 µm or less. The negative electrode plate 24 can be made by applying a negative electrode mixture slurry including a negative electrode active material and a binder, on a negative electrode core body, drying the coating film to remove the dispersant, and then compressing the coating film to form a negative electrode mixture layer on both sides of the negative electrode core body.

The negative electrode mixture layer includes a carbon-based active material that reversibly absorbs and releases lithium ions, for example, as a negative electrode active material. Preferred carbon-based active materials are natural graphite, such as scale-like graphite, lumpy graphite, and earthy graphite, and artificial graphite, such as lumpy artificial graphite and graphitized mesophase carbon microbeads (MCMB). A Si-based active material consisting of at least one of Si or a Si-containing compound may be used for the negative electrode active material, and a carbon-based active material and a Si-based active material may be used together.

As in the case of the positive electrode, the binder included in the negative electrode mixture layer may be a fluorine-containing resin such as PTFE, or PVdF, PAN, polyimide, acrylic resin, polyolefin, or the like, and is preferably styrene-butadiene rubber (SBR). The negative electrode mixture layer may also include CMC or its salt, polyacrylic acid (PAA) or its salt, PVA, or the like. The CMC or its salt functions as a thickener to adjust the negative electrode mixture slurry to an appropriate viscosity range, and, like SBR, also functions as a binder.

A preferred example of the negative electrode mixture layer includes a negative electrode active material having a median diameter of 8 µm or more and 12 µm or less on a volume basis, an SBR, and CMC or its salt. The median diameter on a volume basis is the particle diameter with 50% volume integrated value in the particle size distribution measured by the laser diffraction scattering method, and is also called the 50% particle diameter (D50) or medium diameter. The packing density of the negative electrode mixture layer is mainly determined by the packing density of the negative electrode active material, and the D50, particle size distribution, and shape of the negative electrode active material, for example, greatly affect the packing density. The content of SBR, and CMC or its salt each are preferably 0.1% by mass or more and 5% by mass or less, more preferably 0.5% by mass or more and 3% by mass or less relative to the mass of the negative electrode mixture layer.

The negative electrode mixture layer includes a first region located in the flat part 21b of the electrode winding 21 and a second region located in the pair of curved parts 21a, and the rate (D/C) of the packing density (D) of the second region to the packing density (C) of the first region may be 0.75 or more and 0.98 or less. In other words, the packing density of the negative electrode mixture layer in the curved parts 21a of the electrode winding 21 may be 0.75 times or more and 0.98 times or less the packing density in the flat part 21b. The packing density rate (D/C) is more preferably 0.78 or more and 0.97 or less, particularly preferably 0.80 or more and 0.96 or less.

The retention of electrolyte in the negative electrode mixture layer is better in the second region (curved parts 21a) with a lower packing density, than in the first region (flat part 21b) with a higher packing density. When the packing density rate (D/C) is 0.75 or more and 0.98 or less, the electrolyte pushed out upon expansion of the volume of the flat part 21b can be efficiently stocked in the curved parts 21a, and when the volume of the flat part 21b shrinks, the electrolyte stocked in the curved parts 21a quickly returns to the flat part 21b. Hence, the electrolyte shortage in the flat part 21b and the resulting high-rate degradation can be suppressed more effectively.

The packing densities (C, D) of the first and second regions may be any values that satisfy the aforementioned packing density rate (D/C), but from the viewpoint of battery capacity and the like, are preferably 0.9 mg/cm$^3$ or more, more preferably 1.0 mg/cm$^3$ or more. The packing density (C) of the first region is, for example, 1.15 mg/cm$^3$ or more and 1.35 mg/cm$^3$ or less, more preferably 1.20 mg/cm$^3$ or more and 1.30 mg/cm$^3$ or less. The packing density (D) of the second region is, for example, 1.05 mg/cm$^3$ or more and 1.25 mg/cm$^3$ or less, more preferably 1.10 mg/cm$^3$ or more and 1.20 mg/cm$^3$ or less.

The packing density (C) of the first region is preferably approximately uniform throughout the first region. Similarly, the packing density (D) of the second region is preferably approximately uniform throughout the second region. However, a part of the first region may include a portion that has a lower or higher packing density (the same applies to the second region). The packing densities (C, D) are determined by measuring the mass of the negative electrode mixture layer per unit area of the negative electrode core body and the thickness of the negative electrode mixture layer, and dividing the mass by the thickness.

The packing density rate (D/C) can be adjusted within the range of 0.75 to 0.98 depending on the pressing conditions for forming the wounding of the positive electrode plate 23, the negative electrode plate 24, and the separator into a flat shape. To be specific, the packing density rate (D/C) can be adjusted by changing the pressing temperature, pressing pressure, and pressing time as appropriate. It is also possible to adjust the packing density rate (D/C) by changing the amount of negative electrode mixture slurry between the portions to be the first and second regions of the negative electrode core body; however, from the viewpoint of productivity and the like, it is preferable to adjust the packing density rate (D/C) by changing the pressing conditions after forming a negative electrode mixture layer with an approximately uniform packing density.

At the same pressing temperature and with the same pressing time, the higher the pressing pressure is, the higher the packing density (C) of the first region becomes, and the lower the packing density rate (D/C) tends to become. In contrast, the lower the pressing pressure is, the lower the packing density (C) of the first region becomes, and the higher the packing density rate (D/C) tends to become. The pressing pressure is, for example, 60 kN or more and 115 kN or less, more preferably, 60 kN or more and 80 kN or less.

[Separator]

A porous sheet having ion permeability and insulation properties is used as the separator. The separator (porous sheet) includes a porous base mainly composed of at least one selected from the group consisting of polyolefin, polyvinylidene fluoride, polytetrafluoroethylene, polyimide, polyamide, polyamide-imide, polyethersulfone, polyetherimide, and aramid. Polyolefin, especially polyethylene and polypropylene, is preferred.

The separator may consist only of a porous base made of resin, or may have a multi-layer structure in which a heat-resistant layer or the like including inorganic particles and the like is formed on at least one side of the porous base. The porous base made of resin may have a multi-layer structure in which, for example, polypropylene, polyethylene, and polypropylene are stacked in this order. The thickness of the separator is, for example, 10 μor more and 30 μm or less. The separator has, for example, an average pore diameter of 0.02 μm or more and 5 μm or less, and a porosity of 30% or more and 70% or less. In general, the electrode winding 21 includes two separators, and the separators can be of the same type.

[Battery Case]

The battery case 30 has a rectangular outer body 31 having an opening in the upper part, and a sealing plate 32 for sealing the opening. The rectangular outer body 31 and the sealing plate 32 are each made of metal, preferably of aluminum or an aluminum alloy. Although there is no limitations on the sizes, the lateral length is 120 mm or more and 140 mm or less, the height is 60 mm or more and 70 mm or less, and the thickness is 11 mm or more and 14 mm or less, for example. The can thickness of the surface facing the flat part of the electrode winding is preferably 0.3 mm or more and 1.5 mm or less, more preferably 0.4 mm or more and 1.1 mm or less, most preferably 0.5 mm or more and 0.7 mm or less. If the thickness is less than 0 3 mm, enough strength is not provided and there is even a risk that sufficient sealing of the inside of the can against scratching on the battery case 30 is not ensured. If the thickness is 1.5 mm or more, the rigidity is too high, posing a risk that even pressurizing through the spacer 40 from outside the battery case 30 does not apply a desired pressure to the electrode winding 21.

The electrode winding 21 covered with an insulating sheet not shown in the drawing is contained inside the rectangular outer body 31. The sealing plate 32 is welded to the opening edge of the rectangular outer body 31 by laser welding or the like.

The sealing plate 32 has an electrolyte injection hole 35. The electrolyte injection hole 35 is sealed with a sealing plug 36 after a non-aqueous electrolyte is injected into the battery case 30. The sealing plate 32 has a gas outlet valve 37 for discharging gas when the pressure inside the battery exceeds a predetermined level. In the battery laminate 11, a discharge duct (not shown in the drawing) extending in the stacking direction may be disposed in the position corresponding to the upper side of the gas outlet valves 37 of the multiple rectangular batteries 20 in order to discharge gas from the gas outlet valve 37 to the outside.

[Electrolyte]

The electrolyte is preferably composed of a non-aqueous solvent and an electrolyte salt dissolved in the non-aqueous solvent from the viewpoint of ionic conductivity. Examples of the non-aqueous solvent include esters, ethers, nitriles, amides, and mixtures of two or more of these solvents. The non-aqueous solvent may contain a halogen substituent in which at least a part of the hydrogen of these solvents is replaced by a halogen atom such as fluorine. The viscosity of the non-aqueous electrolyte at 25° C. is preferably 2.0 mPa·s or more and 6.0 mPa·s or less, more preferably 3.0 mPa·s or more and 5.0 mPa·s or less, and most preferably 3.5 mPa·s or more and 4.5 mPa·s or less. If it is less than 2.0 mPa·s, the electrolyte may move too much upon charging and discharging and leak from the curved parts 21a to the outside of the electrode winding 21, preventing the electrolyte from being efficiently stocked. If it exceeds 6.0 mPa·s, the ionic conductivity may decrease and the input/output may be degraded. Lithium salt such as LiPF6, for example, is used as the electrolyte salt. The concentration of the electrolyte salt is preferably 0.7 mol/L or more and 1.5 mol/L or less from the viewpoint of electrolyte viscosity. The amount of non-aqueous electrolyte is preferably 20 g or more and 150 g or less, more preferably 25 g or more and 75 g or less. In particular, when the electrode winding 21 and the battery case 30 have the aforementioned sizes, the amount of non-aqueous electrolyte is preferably 30 g or more and 50 g or less in order to fill the voids in the positive electrode plate 23, the negative electrode plate 24, and the separator, as well as the gaps between the positive electrode plate 23, the negative electrode plate 24, and the separator.

Figure 3:
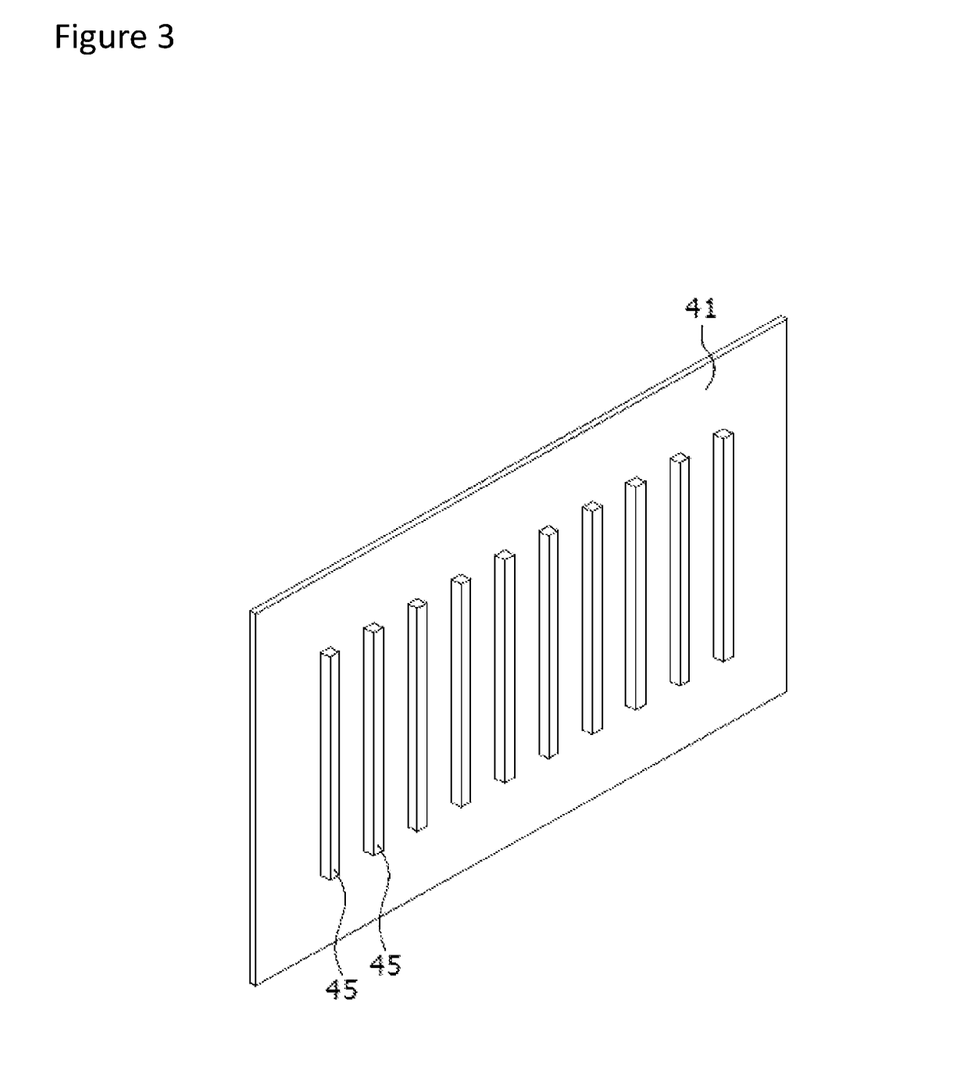
FIG. 3 is a perspective view of spacers of the embodiment.
Figure 4:
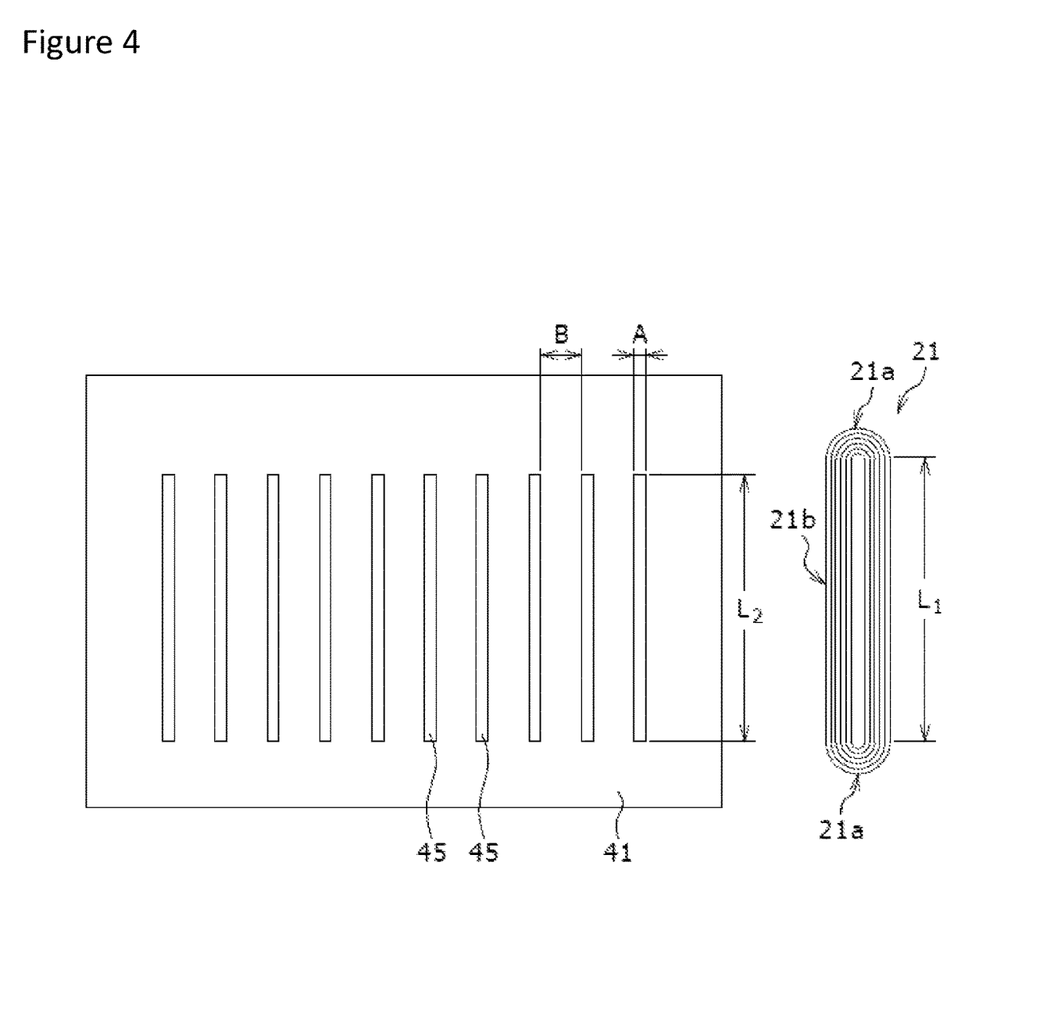
FIG. 4 is a front view of the spacers of this embodiment and the surface orthogonal to the width direction of electrode windings that are stacked on the spacers with the case therebetween.

The spacers 40 will now be described with reference to FIGS. 3 and 4. FIG. 3 is a perspective view of the board 41 of the spacer 40. FIG. 4 is a diagram for describing a front view of the board 41, and a surface orthogonal to the width direction of the electrode winding 21 (a cross section along the height direction) and laid over the spacer 40 with the battery case 30 therebetween.

Each spacer 40 is located between adjacent rectangular batteries 20. It is preferable that the spacer 40 have the function of insulating adjacent rectangular batteries 20 from each other. In the case where the battery case 30 is covered with an insulating film, it does not necessarily need to have an insulating function. The spacer 40 also has the function of adjusting the length of the battery laminate 11 in the stacking direction (thickness direction). It may also have the function of cooling the rectangular batteries 20, being provided with ribs or the like to allow air or other gases to flow into the channels. The spacers 40 are fabricated, for example, by molding polypropylene, polystyrene, polycarbonate, aluminum alloy, stainless steel, or the like, although the present disclosure does not limit the material for them.

The present inventors have found that when the position of the flat part 21b of the electrode winding 21 and the position where a pressure is applied from the spacer 40 to the rectangular battery 20 are in a favorable relationship, the high-rate degradation can be effectively reduced by inducing the electrolyte that is pushed out and returns upon charging and discharging. To be specific, this can be achieved by inducing, when the electrode winding expands due to the expansion of the negative electrode during charging, the electrolyte pushed out along the direction of pressure from the flat part 21b of the electrode winding 21 through the ribs 45, to the curved parts 21a where the packing density is relatively low compared to the flat part 21b, the can pressure is low, and the interlayer distances between the positive electrode plate 23 and the separator and between the separator and the negative electrode plate 24 are large. In other words, the electrolyte can be stocked in the curved parts 21a.

In addition, regarding the electrode winding 21 of the present disclosure, the height is shorter than the width, so that the electrolyte pushed out of the center of the electrode winding 21 (the center with respect to the width and height directions) does not travel a long distance in the width direction when pushed out but travels approximately the shortest distance toward the curved parts 21a along the directions of the pressures from the ribs 45 when pushed out. The electrolyte pushed out and stocked in the curved parts 21a can return to the flat part in the short distance along the directions of the pressures from the ribs 45 when the volume of the flat part 21b shrinks upon discharging, thereby reducing the electrolyte shortage in the center (flat part) of the electrode winding 21. Therefore, according to the assembled battery of the present disclosure, the high-rate degradation caused by a decrease in the amount of the electrolyte in the flat parts in the electrode assembly can be reduced.

The shape of the spacer 40 preferred to maximize the advantageous effects of the present disclosure will be described below.

As described above, each spacer 40 has a flat board 41 and multiple ribs 45 protruding on one or both sides of the board 41 in the thickness direction. Multiple ribs 45 are formed, extending in the height direction. The ribs 45 face the flat part 21b of the electrode winding 21 when the spacer 40 is located between rectangular batteries 20 (see FIG. 4).

The ribs 45 are straight lines in an approximately parallel to the height direction. "Approximately parallel" covers a range of up to ±10° from the actual parallel direction. The ribs 45 are continuous without interruption along the height direction. This allows the electrolyte to be pushed out without interruption when the flat part 21b of the electrode winding 21 is pressed. It is preferable that the lengths of the multiple ribs 45 be approximately the same. This allows the flat part 21b of the electrode winding 21 to be pressurized uniformly.

The ribs 45 are formed in portions facing the positive electrode mixture layer and negative electrode mixture layer. Hence, no pressure is applied to the electrically connected laminate portion of the positive electrode core body exposed portion 23a and the positive electrode current collector 25, and the laminate portion of the negative electrode core body exposed portion 24a and the negative electrode current collector 26.

When the height L1 of the flat part 21b of the electrode winding 21 is 100, the length L2 of the ribs 45 is 60 or more and 100 or less. More strictly, the length L2 of the ribs 45 is preferably 70 or more and 90 or less, more preferably 70 or more and 80 or less.

It is preferable that the ribs 45 be formed so that the center with respect to the height direction of the spacer 40 and the center with respect to the height direction of the ribs 45 are approximately coincident. This allows the ribs 45 to press the flat part 21b of the electrode winding 21 uniformly in the height direction between the upper and lower sides.

Adjacent ribs 45 are aligned on the board 41 in the width direction at predetermined intervals. When the width of the ribs 45 is A and the interval between adjacent ribs 45 is B, the relationship between the width A and the interval B is expressed as $2 \leq B/A \leq 10$. More strictly, the relationship between the width A and the interval B is preferably $2 \leq B/A \leq 5$.

Any number of ribs 45 may be used as long as, as described above, $2 \leq B/A \leq 10$ where the length of the ribs 45 in the width direction is the width A and the interval between adjacent ribs 45 is the interval B is satisfied. For instance, about 10 to 15 ribs can be used.

The ribs 45 may have any width as long as $2 \leq B/A \leq 10$ described above is satisfied, but preferably has a width that is 1 to 10%, more preferably 2 to 4% of the horizontal width of the electrode winding. For instance, the width may be about 2 to 4 mm.

The ribs 45 may be aligned at any interval as long as $2 \leq B/A \leq 10$ described above is satisfied. For instance, the interval may be about 6 to 8 mm.

The width A of the ribs 45 and the interval B between the ribs 45 are preferably approximately uniform in order to uniformly press the electrode winding, but are not fixed as long as $2 \leq B/A \leq 10$ described above is satisfied.

The ribs illustrated in the drawing have a linear shape which is preferred but not necessarily adopted. For instance, the rib shape in the front view of the spacer in FIG. 4 is not necessarily a rectangle, but may be a trapezoid or a diamond shape. In this case, the aforementioned width A and interval B are defined by the center length in the rib height direction. The protruding shape of the ribs does not necessarily extend linearly. For instance, it may be wider on the board side and thinner on the side in contact with the rectangular battery. In this case, the aforementioned width A and interval B are defined by the length on the board side.

In the assembled battery 10 of this embodiment, the spacer 40 has 10 ribs 45 that have a length of 35 mm and a width of 3 mm on one side defined with respect to the stacking direction, that extend in the height direction of the electrode winding 21, and that are aligned in the width direction of the electrode winding 21 at an interval of 7 mm (here, when the height of the flat part 21*b* of the electrode winding 21 is 100, the length of the ribs 45 in the height direction is 70. Also, when the rib width is A and the interval between ribs is B, B/A=2.3.)

It should be appreciated that the present disclosure is not limited to the aforementioned embodiments and modifications thereof, and various changes and improvements can be made without departing from the scope of the claims of the present application.

The present disclosure will now be further explained taking Examples, but should not be limited to these Examples.

EXAMPLE 1

Fabrication of Rectangular Battery

A positive electrode slurry was applied to an aluminum foil with a width of 104.8 mm (coating width: 89.6 mm=length of the positive electrode mixture layer along the axial direction of the electrode assembly (K)) to form a coating film, which was then dried. A positive electrode plate was prepared by compressing the dried coating film and cutting a current collector with the coating film formed on it. A negative electrode slurry was applied to a copper foil with a width of 106.8 mm (coating width: 94.8 mm) to form a coating film, which was then dried. A negative electrode plate was prepared by compressing the dried coating film and cutting a current collector with the coating film formed on it. The width of the separator is 100.0 mm The positive electrode and negative electrode were wound together with the separator therebetween to prepare a cylindrical electrode winding. The cylindrical electrode winding was pressed at 70 kN, thereby fabricating a flat electrode winding with a flat part and curved parts.

The electrode winding had a width of 116.3 mm, a thickness of 10.5 mm, a height (=electrode winding height (H)) of 57.6 mm, and an aspect ratio K/H of 1.6. The flat part of the electrode winding was 50 mm in height. The rate (D/C) of the packing density (D) in the second region to the packing density (C) in the first region of the negative electrode mixture layer was 0.96. The thickness of the electrode winding holder was 10.5 mm, and the positive electrode core body exposed portion and negative electrode core body exposed portion of the electrode winding were connected to the positive electrode current collector plate and negative electrode current collector of the sealing assembly, respectively, by welding, and the electrode winding was inserted into a can that had a width of 120.0 mm (inner dimension of 119.2 mm), a thickness of 12.6 mm (inner dimension of 11.4 mm, the thickness of the surface facing the flat part of the electrode winding was 0.6 mm), and a height of 65.0 mm (inner dimension of 62.9 mm), and 38 g of electrolyte (electrolyte salt concentration: 1.3 mol/L, viscosity: 4.0 mPas) was injected in it. After the electrolyte salt was fully immersed, temporary charging was performed and the inlet was closed, thereby fabricating a non-aqueous electrolyte rectangular secondary battery (battery capacity: 5.0 Ah).

Fabrication of Assembled Battery

Rectangular batteries fabricated and spacers with multiple ribs, which will be described later, were stacked alternately, fabricating an assembled battery so that the constraint thickness between the rectangular batteries was 12.5 mm The rectangular batteries were stacked in different orientations so that the positive and negative electrode terminals were alternately aligned, and the positive and negative electrode terminals adjacent to each other in the stacking direction were connected with a bus bar to electrically connect the multiple rectangular batteries.

In Example 1, an assembled battery was fabricated using spacers each located between adjacent rectangular batteries. Polypropylene was used as a material for the spacers. On one side of each spacer defined with respect to the stacking direction, ribs of 35 mm in length and 3 mm in width were formed parallel with each other on the surface of the board, and ten spacers were aligned at an interval of 7 mm in the width direction of the electrode winding so that the formed ribs were parallel with the height direction of the winding axis of the electrode winding (here, when the height of the flat part of the electrode winding is 100, the length of the ribs in the height direction is 70 as shown in Table 1. When the width of the ribs is A and the interval between ribs is B, B/A=2.3 as shown in Table 1.)

For battery evaluation, a cycle test was conducted to check the reversible degradation rate of discharge resistance. The cycle test conditions were as follows: at a battery temperature of 50° C., the battery was subjected to 2000 cycles of charging from 20% to 80% of the initial battery capacity at 10 It (50 A) and discharging from 80% to 20% repeatedly without interruption. The charge/discharge current value is not limited to 10 It, and the effect can be obtained by cycles at a current value of 5 It or higher. The "reversible degradation rate of discharge resistance" was defined as the "rate of increase in resistance after 60 days of cycle test" minus the "rate of increase in resistance immediately after the cycle test." The rate of increase in resistance was defined as the discharge resistance after the cycle test/initial discharge resistance×100 (%), and the discharge resistance value was defined as the value obtained 10 seconds after the battery was discharged from 50% capacity at 240 A.

EXAMPLE 2

In Example 2, an assembled battery was fabricated using spacers that are the same as those in Example 1 except that they have a rib length of 50 mm, and as shown in Table 1, a height of 100 which is equal to that of the flat part of the electrode winding.

EXAMPLE 3

In Example 3, an assembled battery was fabricated using spacers that are the same as those in Example 1 except that they have a rib length of 40 mm, and as shown in Table 1, a height of 80 with respect to the height of the flat part of the electrode winding.

EXAMPLE 4

In Example 4, an assembled battery was fabricated using spacers that are the same as those in Example 1 except that they have a rib length of 30 mm, and as shown in Table 1, a height of 60 with respect to the height of the flat part of the electrode winding.

EXAMPLE 5

In Example 5, an assembled battery was fabricated using spacers that are the same as those in Example 1 except that they have a rib length of 30 mm and a rib width of 2.8 mm, and four ribs arranged at an interval of 28 mm (here, when the height of the flat part of the electrode winding is 100 as shown in Table 1, the length of the ribs in the height direction is 60 as shown in Table 1. Also, when the rib width is A and the interval between ribs is B, B/A=10 as shown in Table 1.)

Comparative Example 1

In Comparative Example 1, five ribs with a length of 95 mm and a width of 3 mm are formed parallel with the width direction of the electrode winding, and arranged at an interval of 7 mm in the height direction of the electrode winding.

Comparative Example 2

In Comparative Example 2, an assembled battery was fabricated using spacers that are the same as those in Example 1 except that they have a rib length of 130 as shown in Table 1.

Comparative Example 3

In Comparative Example 3, an assembled battery was fabricated using spacers that are the same as those in Example 1 except that they have a rib length of 50 as shown in Table 1.

Comparative Example 4

In Comparative Example 4, ribs having a length of 50 mm and a width of 3 mm were formed perpendicular to the width direction (the height direction) of the electrode winding. Three ribs on the positive electrode terminal side and three ribs on the negative electrode terminal side were arranged at an interval of 7 mm in the width direction of the electrode winding. The rib interval in the center portion of the rectangular battery was 47 mm (here, when the width of the ribs is A and the interval between adjacent ribs in the center portion is B, B/A=15.7 as shown in Table 1.)

TABLE 1

| | Spacer shape | | | | | Results after cycles | |
| --- | --- | --- | --- | --- | --- | --- | --- |
| | Rib orientation to winding axis of electrode winding | Rib length [electrode winding flat region height is 100] | Rib width A [mm] | Rib interval B [mm] | Rate B/A | Discharge resistance degradation rate [relative value to Example 1 as 100] | Discharge resistance reversible degradation rate [%] |
| Example 1 | Perpendicular | 70 | 3 | 7 | 2.3 | 100.0 | 0.24 |
| Example 2 | Perpendicular | 100 | 3 | 7 | 2.3 | 100.1 | 0.47 |
| Example 3 | Perpendicular | 80 | 3 | 7 | 2.3 | 100.0 | 0.32 |
| Example 4 | Perpendicular | 60 | 3 | 7 | 2.3 | 100.5 | 0.72 |
| Example 5 | Perpendicular | 60 | 2.8 | 28 | 10.0 | 101.0 | 0.97 |
| Comparative Example 1 | Parallel | — | 3 | 7 | 2.3 | 101.3 | 1.0 |
| Comparative Example 2 | Perpendicular | 130 | 3 | 7 | 2.3 | 101.1 | 0.67 |
| Comparative Example 3 | Perpendicular | 50 | 3 | 7 | 2.3 | 102.1 | 2.1 |
| Comparative Example 4 | Perpendicular | 100 | 3 | 47 | 15.7 | 101.7 | 1.9 |

The rectangular batteries of Examples suppress degradation after the cycle test compared to the rectangular batteries of Comparative Examples. One conceivable reason is that the electrolyte pushed out of the flat part of the electrode winding when the electrode winding expanded due to the expansion of the negative electrode upon charging was guided along the ribs toward the curved parts and effectively stocked in the curved parts. It is assumed that when the volume of the flat part shrank, for example, upon discharging, the electrolyte stocked in the curved parts was guided along the ribs and returned to the flat part, which suppressed the electrolyte shortage in the flat part.

Regarding Comparative Example 1 in which the ribs that press the electrode winding are parallel with the width direction of the electrode winding, it is assumed that the electrolyte was pushed out of the electrode winding because the electrolyte was not guided toward the curved parts upon expansion and shrinkage of the electrode winding due to charging and discharging. It is therefore assumed that the electrolyte in the flat part was insufficient and the high-rate degradation increased.

In Comparative Example 2, the rib length is as long as 130 relative to the height of the electrode winding. In other words, it is assumed that the ribs are close to the sealing plate of the battery case and the bottom of the rectangular outer body, which have high rigidity, so that pressing through the spacers 40 from outside the battery case 30 does not apply the targeted pressure to the electrode winding 21, resulting in a low ability to guide the electrolyte to the curved parts upon expansion and shrinkage of the electrode winding due to charging and discharging. It is therefore assumed that the electrolyte in the flat part was insufficient, and the high-rate degradation increased.

Regarding Comparative Example 3, it is assumed that the length of the ribs was not long enough with respect to the height of the electrode winding, and the electrolyte was pushed out of the electrode winding from the area of the flat part of the electrode winding that was not pressed by the ribs during the expansion and shrinkage of the electrode winding due to charging and discharging. It is therefore assumed that the electrolyte in the flat part was insufficient, and the reversible degradation rate of the discharge resistance increased.

In Comparative Example 4, B/A is as large as 15.7. It is assumed that the travel direction of the electrolyte cannot be controlled along the curved parts because the non-pressurized part with respect to the pressurized part in the width direction is wide. It is therefore assumed that the electrolyte was pushed out of the electrode winding, resulting in insufficiency of the electrolyte in the electrode winding and an increase in the high-rate degradation.

REFERENCE SIGNS LIST

10 Assembled battery
11 Battery laminate
20 Rectangular battery
21 Electrode winding
21*a* Curved part
21*b* Flat part
23 Positive electrode plate
23*a* Positive electrode core body exposed portion
24 Negative electrode plate
24*a* Negative electrode core body exposed portion
25 Positive electrode current collector
26 Negative electrode current collector
27 Insulating sheet
30 Battery case
31 Rectangular outer body
32 Sealing plate
33 Positive electrode terminal
33*a* Flange
34 Negative electrode terminal
34*a* Flange
35 Electrolyte injection hole
36 Sealing plug
37 Gas outlet valve
40 Spacer
41 Board
42 Frame
45 Rib

The invention claimed is:

1. An assembled battery comprising:
   at least one minimum unit of a rectangular battery and two spacers sandwiching the rectangular battery, wherein:
   the rectangular battery comprises:
     an electrode winding having a positive electrode plate including a positive electrode mixture layer and a positive electrode core body exposed portion, and a negative electrode plate including a negative electrode mixture layer and a negative electrode core body exposed portion, wound together with a separator between the positive electrode plate and the negative electrode plate, the electrode winding having a flat part with a flat outer surface and two curved parts with curved outer surfaces;
     a non-aqueous electrolyte; and
     a battery case containing the electrode winding and the non-aqueous electrolyte,
   each of the two spacers has a board and multiple ribs protruding from at least one side of the board,
   the ribs face the flat part of the electrode winding and extend in a direction perpendicular to the winding axis of the electrode winding,
   when the height of the flat part of the electrode winding is 100, the length of the ribs is 60 or more and 100 or less,
   when the width of the ribs is A and the interval between the adjacent ribs is B, 2≤B/A ≤10, and
   the multiple ribs are only formed in portions facing the positive electrode mixture layer and the negative electrode mixture layer.

2. The assembled battery according to claim 1, wherein the ratio (K/H) of the length (K) of the positive electrode mixture layer along the width direction of the ribs to the length (H) in the direction perpendicular to the directions of the width and thickness of the electrode windings is 1.2 or more.

3. The assembled battery according to claim 1, wherein the battery case contains 20 g or more and 150 g or less of the non-aqueous electrolyte.

4. The assembled battery according to claim 1, wherein the viscosity of the non-aqueous electrolyte is 2.0 mPa·s or more and 6.0 mPa·s or less.

5. The assembled battery according to claim 1, wherein the battery case is made of aluminum or an aluminum alloy, and has a surface facing the flat part of the electrode winding and having a thickness of 0.3 mm or more and 1.5 mm or less.

6. The assembled battery according to claim 1, wherein the negative electrode mixture layer includes a first region located in the flat part of the electrode winding and a second region located in the two curved parts, and the rate (D/C) of the packing density (D) of the second region to the packing density (C) of the first region is 0.75 or more and 0.98 or less.

7. The assembled battery according to claim 1, wherein the negative electrode mixture layer includes a negative electrode active material having a median diameter of 8 μm or more and 12 μm or less on a volume basis, styrene-butadiene rubber, and carboxymethyl cellulose or a salt of carboxymethyl cellulose.

8. An assembled battery comprising:
a plurality of rectangular batteries; and
a plurality of spacers disposed between adjacent two rectangular batteries, respectively, wherein:
each of the plurality of rectangular batteries comprises:
an electrode winding having a positive electrode plate including a positive electrode mixture layer and a positive electrode core body exposed portion, and a negative electrode plate including a negative electrode mixture layer and a negative electrode core body exposed portion, wound together with a separator between the positive electrode plate and the negative electrode plate, the electrode winding having a flat part with a flat outer surface and two curved parts with curved outer surfaces;
a non-aqueous electrolyte; and
a battery case containing the electrode winding and the non-aqueous electrolyte,
each of the plurality of spacers has a board and multiple ribs protruding from at least one side of the board,
the ribs face the flat part of the electrode winding and extend in a direction perpendicular to the winding axis of the electrode winding,
when the height of the flat part of the electrode winding is 100, the length of the ribs is 60 or more and 100 or less,
when the width of the ribs is A and the interval between the adjacent ribs is B, $2 \leq B/A \leq 10$, and
the multiple ribs are only formed in portions facing the positive electrode mixture layer and the negative electrode mixture layer.

* * * * *